(12) United States Patent  
Sasada et al.

(10) Patent No.: US 9,196,887 B2  
(45) Date of Patent: Nov. 24, 2015

(54) ASSEMBLED BATTERY WIRING MEMBER AND ASSEMBLED BATTERY MODULE

(71) Applicant: Hitachi Cable, Ltd., Tokyo (JP)

(72) Inventors: Kazuhiko Sasada, Saitama (JP); Hidenori Kobayashi, Hitachi (JP); Hiroaki Komatsu, Hitachi (JP); Masamitsu Konya, Hitachi (JP)

(73) Assignee: HITACHI METALS, LTD., Toyko (JP)

( * ) Notice: Subject to any disclaimer, the term of this patent is extended or adjusted under 35 U.S.C. 154(b) by 317 days.

(21) Appl. No.: 13/802,128

(22) Filed: Mar. 13, 2013

(65) Prior Publication Data

US 2013/0260193 A1     Oct. 3, 2013

(30) Foreign Application Priority Data

Mar. 28, 2012   (JP) ................. 2012-074117

(51) Int. Cl.
| | |
|---|---|
| *H01M 2/20* | (2006.01) |
| *H01M 2/22* | (2006.01) |
| *H01M 2/30* | (2006.01) |
| *H01M 10/48* | (2006.01) |
| *H01M 10/42* | (2006.01) |

(52) U.S. Cl.
CPC .............. *H01M 2/206* (2013.01); *H01M 2/202* (2013.01); *H01M 10/4207* (2013.01); *H01M 10/486* (2013.01); *H01M 10/425* (2013.01); *H01M 2200/103* (2013.01)

(58) Field of Classification Search
CPC ..... H01M 2/206; H01M 2/20; H01M 10/486; H01M 2/202; H01M 10/407

USPC .................. 429/99, 62, 121, 90, 7, 120, 185; 439/627; 307/10.1

See application file for complete search history.

(56) References Cited

U.S. PATENT DOCUMENTS

| | | | | |
|---|---|---|---|---|
| 1,460,604 | A | * | 7/1923 | Potter ........................... 439/627 |
| 2009/0274952 | A1 | * | 11/2009 | Wood et al. .................... 429/99 |
| 2012/0019061 | A1 | * | 1/2012 | Nishihara et al. ............. 307/10.1 |
| 2012/0328920 | A1 | * | 12/2012 | Takase et al. ................... 429/90 |

FOREIGN PATENT DOCUMENTS

| | | |
|---|---|---|
| JP | 2010-114025 A | 5/2010 |
| JP | 2011-210711 A | 10/2011 |

* cited by examiner

*Primary Examiner* — Kenneth Douyette  
(74) *Attorney, Agent, or Firm* — McGinn IP Law Group, PLLC.

(57) ABSTRACT

An assembled battery wiring member for an assembled battery that plural single cells each having a positive terminal and a negative terminal are arranged in a predetermined array direction and the positive terminal of one of a pair of single cells adjacent in the array direction is connected to the negative terminal of another single cell one after another by a conductive coupling member. It includes a flat cable including plural linear conductors arranged parallel to each other and an insulating film covering the plural linear conductors, and a connecting member to connect the plural linear conductors to the coupling member. The connecting member includes a plate-shaped conductor and an insulation covering the conductor, one end of the conductor is connected to the coupling member and another end of the conductor is connected to the linear conductor through an opening formed in the insulation film of the flat cable.

20 Claims, 13 Drawing Sheets

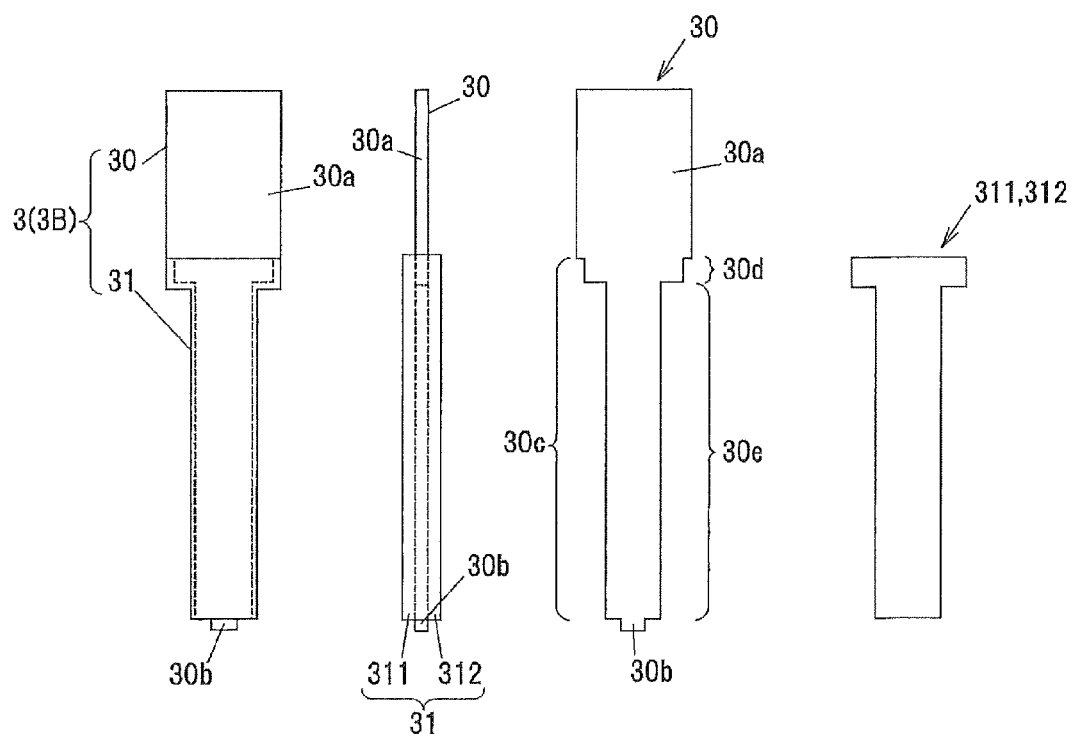

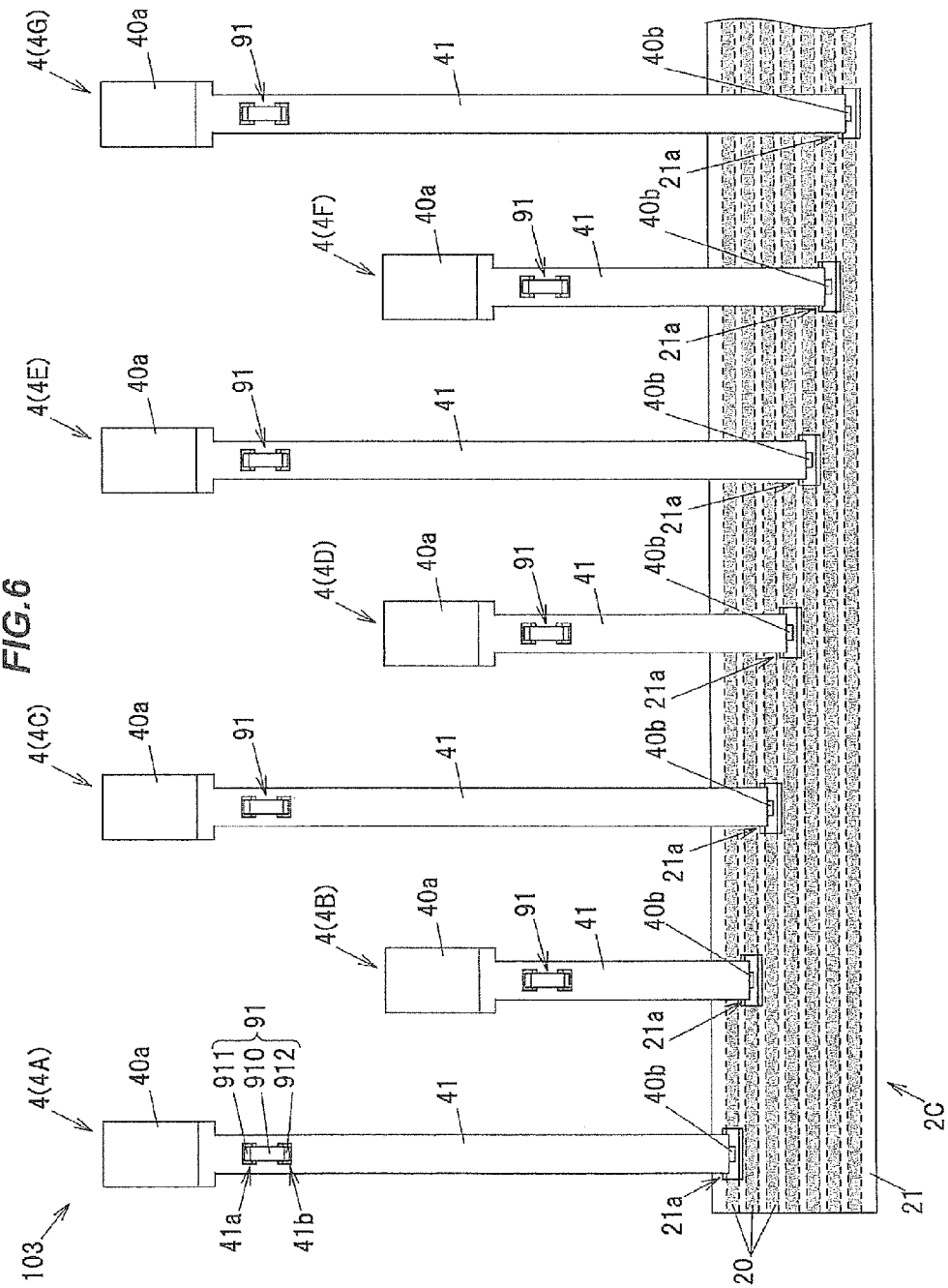

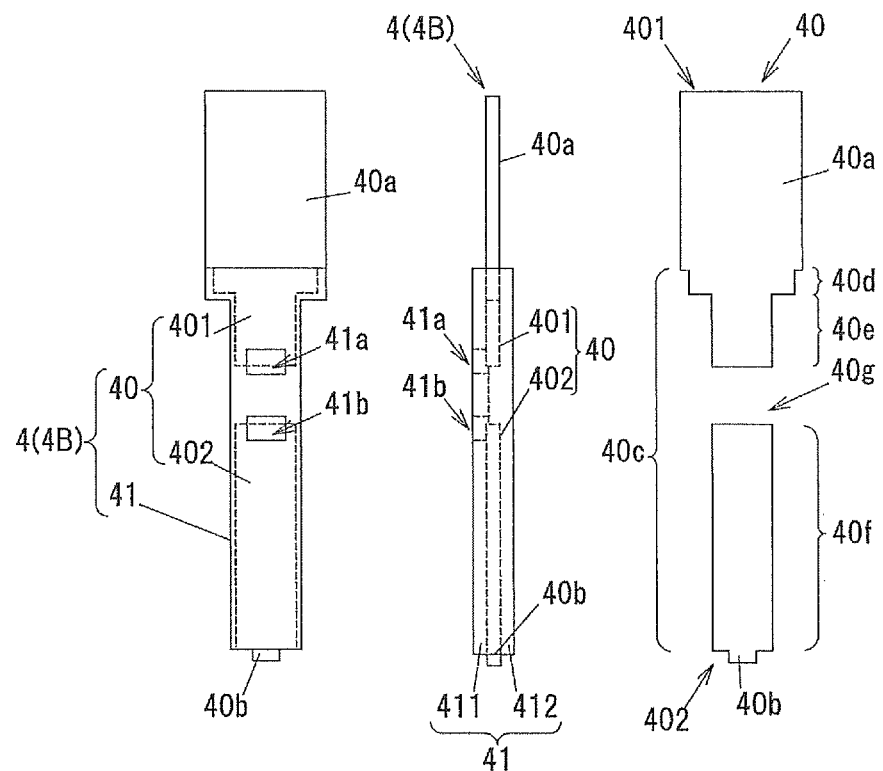
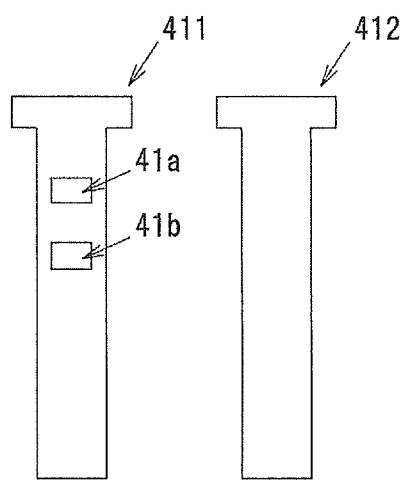

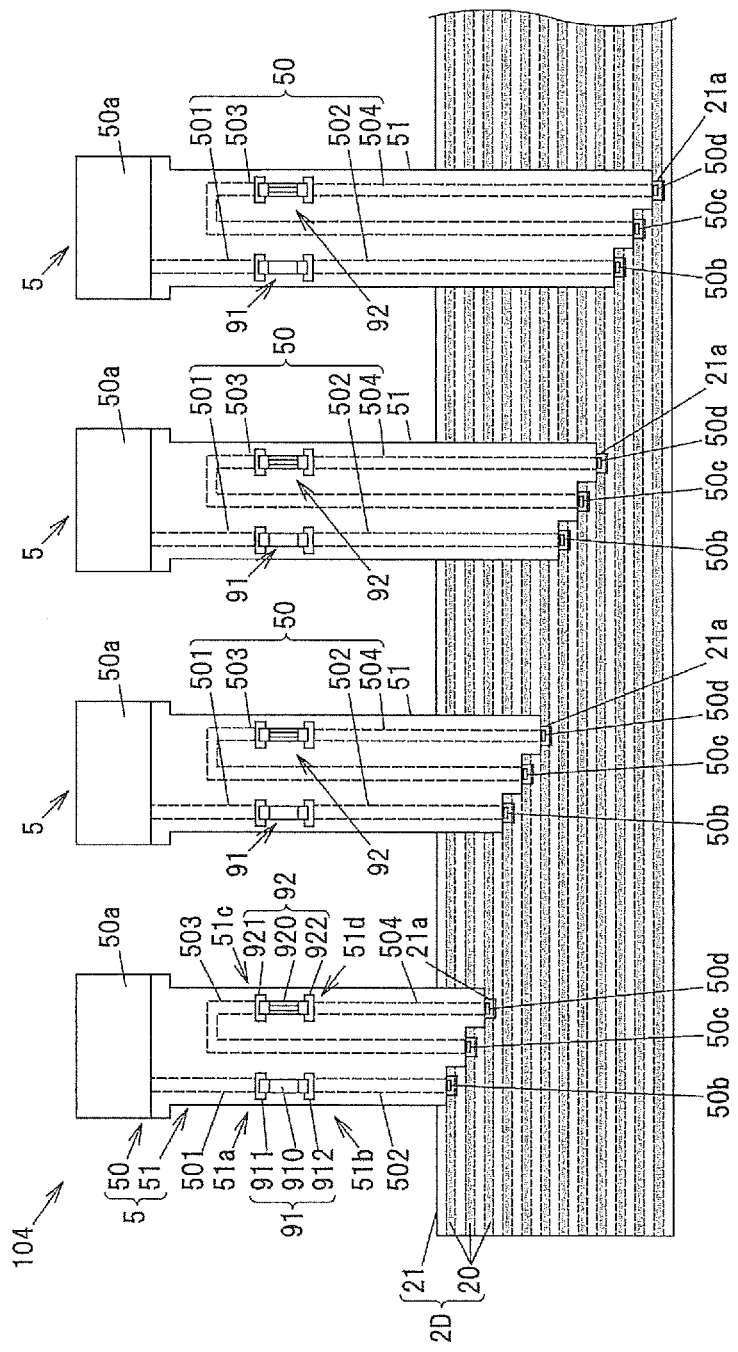

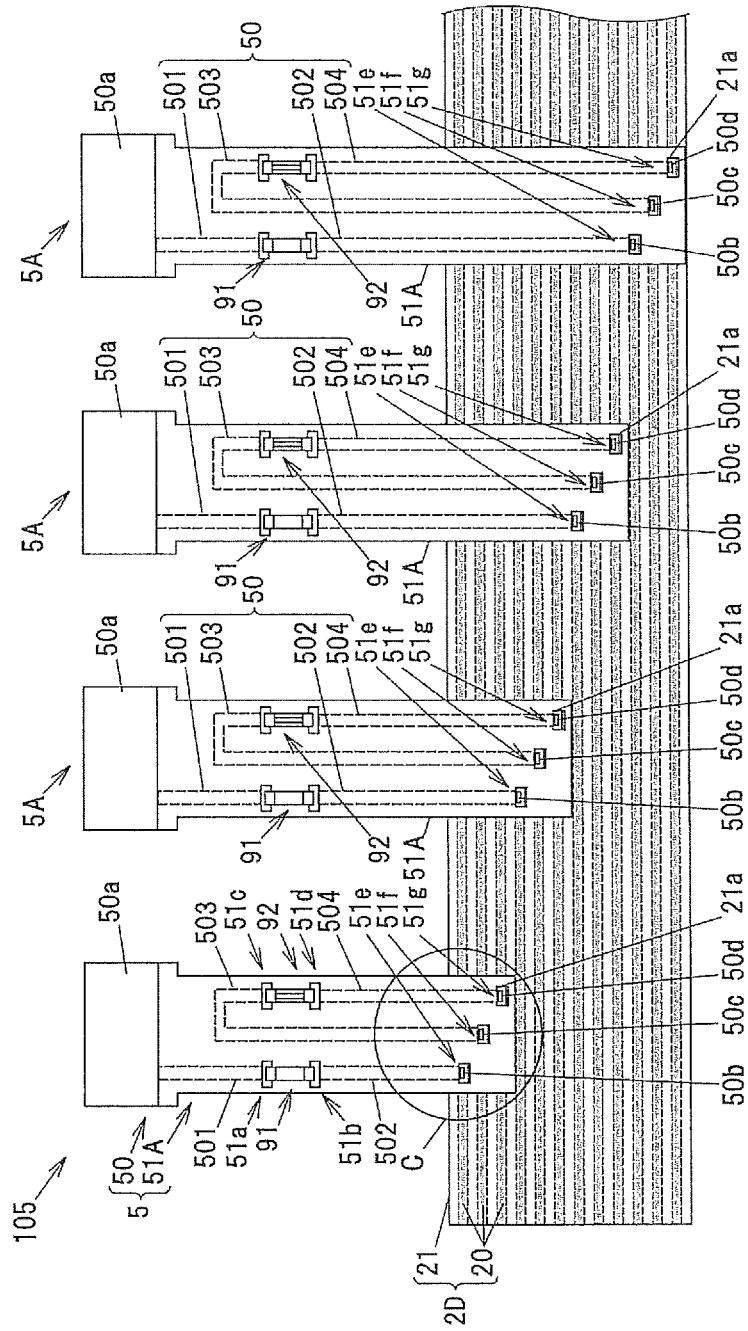

ASSEMBLED BATTERY WIRING MEMBER AND ASSEMBLED BATTERY MODULE

The present application is based on Japanese patent application No. 2012-074117 filed on Mar. 28, 2012, the entire contents of which are incorporated herein by reference.

BACKGROUND OF THE INVENTION

1. Field of the Invention

The invention relates to an assembled battery wiring member provided on an assembled battery which is formed by combining plural single cells, and an assembled battery module comprised of the assembled battery wiring member and the assembled battery.

2. Description of the Related Art

For example, on a vehicle having an electric motor as a driving source for moving the vehicle, a rechargeable battery for storing power to be supplied to the electric motor is mounted. In order to obtain high voltage, the rechargeable battery is configured as an assembled battery in which plural single cells of, e.g., lithium-ion batteries or nickel-metal-hydride batteries are connected in series.

In some of such assembled batteries, in order to monitor respective voltages of the plural single cells, conductors connected to output terminals of single cells are also connected to a control unit which detects voltage and controls charge and discharge of the single cell. And, use of a flat cable as such conductors has been proposed for the purpose of weight saving and cost reduction (see, e.g., JP-A-2011-210711 and JP-A-2010-114025).

In JP-A-2011-210711, a flat cable is arranged in parallel on plural bus bars which connect between positive and negative terminals of single cells and the plural bus bars are respectively connected to conductors of the flat cable. For connection of the bus bars to the conductors of the flat cable, an insulating resin on the flat cable is partially removed by laser, etc., to expose the conductors and the exposed conductor are joined to the bus bars by welding or soldering, etc.

In JP-A-2010-114025, the conductors are separated by slitting the flat cable, excluding a base portion, between the conductors and each separated conductor is welded to the bus bar.

SUMMARY OF THE INVENTION

In JP-A-2011-210711, a size of the bus bar needs to be larger than a width of the flat cable in order to place the flat cable on the bus bar. In other words, a region for arranging the flat cable needs to be separately provided on the bus bar in addition to a region for connecting to the positive and negative terminals, which increases the size of the bus bar and results in running counter to the weight saving and the cost reduction.

Meanwhile, in JP-A-2010-114025, a process of accurately slitting up into the plural conductors and appropriately adjusting a length of each conductor is complicated and causes an increase in the cost. In addition, strength and durability of the flat cable may be reduced by separating off the flat cable between the conductors.

Accordingly, it is an object of the invention to provide an assembled battery wiring member that can measure a voltage of plural single cells via a flat cable while suppressing a size increase in a member for connecting positive and negative terminals of the single cells and a decrease in strength of the flat cable, as well as an assembled battery module.

(1) According to one embodiment of the invention, an assembled battery wiring member for an assembled battery configured such that a plurality of single cells each having a positive terminal and a negative terminal are arranged in a predetermined array direction and the positive terminal of one of a pair of single cells adjacent in the array direction is connected to the negative terminal of another single cell one after another by a conductive coupling member comprises:

a flat cable comprising a plurality of linear conductors arranged parallel to each other and an insulating film covering the plurality of linear conductors; and a connecting member to connect the plurality of linear conductors to the coupling member, wherein the connecting member comprises a plate-shaped conductor and an insulation covering the conductor, one end of the conductor is connected to the coupling member and another end of the conductor is connected to the linear conductor through an opening formed in the insulation film of the flat cable.

In the above embodiment (1) of the invention, the following modifications and changes can be made.

(i) The connecting member is configured such that the conductor is divided into a plurality of conductor portions and an electronic component is interposed between the conductor portions.

(ii) The electronic component comprises one of a fuse and a temperature sensor.

(2) According to another embodiment of the invention, an assembled battery module comprises:

an assembled battery configured such that a plurality of single cells each having a positive terminal and a negative terminal are arranged in a predetermined array direction and the positive terminal of one of a pair of single cells adjacent in the array direction is connected to the negative terminal of another single cell one after another by a conductive coupling member, a flat cable comprising a plurality of linear conductors arranged parallel to each other and an insulating film covering the plurality of linear conductors; and a connecting member to connect the plurality of linear conductors to the coupling member, wherein the connecting member comprises a plate-shaped conductor and an insulation covering the conductor, one end of the conductor is connected to the coupling member and another end of the conductor is connected to the linear conductor through an opening formed in the insulation film of the flat cable.

In the above embodiment (2) of the invention, the following modifications and changes can be made.

(iii) The flat cable is arranged so as to face a second side surface of the single cell that intersects with a first side surface on which the positive and negative terminals are provided.

Effects of the invention

According to one embodiment of the invention, an assembled battery wiring member can be provided that can measure a voltage of plural single cells via a flat cable while suppressing a size increase in a member for connecting positive and negative terminals of the single cells and a decrease in strength of the flat cable, as well as an assembled battery module.

BRIEF DESCRIPTION OF THE DRAWINGS

Next, the present invention will be explained in more detail in conjunction with appended drawings, wherein:

FIGS. 4A to 4D show a structural example of a connecting member, wherein FIG. 4A is a plan view, FIG. 4B is a side view, FIG. 4C is a plan view showing a conductor constituting the connecting member and FIG. 4D is a plan view showing first and second insulations constituting the connecting member;

FIG. 6 is a plan view showing a major portion of an assembled battery wiring member in a third embodiment;

FIGS. 7A to 7E show a structural example of a connecting member, wherein FIG. 7A is a plan view, FIG. 7B is a side view, FIG. 7C is a plan view showing a conductor constituting the connecting member and FIGS. 7D and 7E are plan views showing first and second insulations constituting the connecting member;

FIG. 8 is a plan view showing a major portion of an assembled battery wiring member in a fourth embodiment;

FIG. 9 is a plan view showing a major portion of an assembled battery wiring member in a fifth embodiment;

DETAILED DESCRIPTION OF THE PREFERRED EMBODIMENTS

First embodiment

Next, the first embodiment of the invention will be described in reference to FIGS. 1 to 4D.

Figure 1:
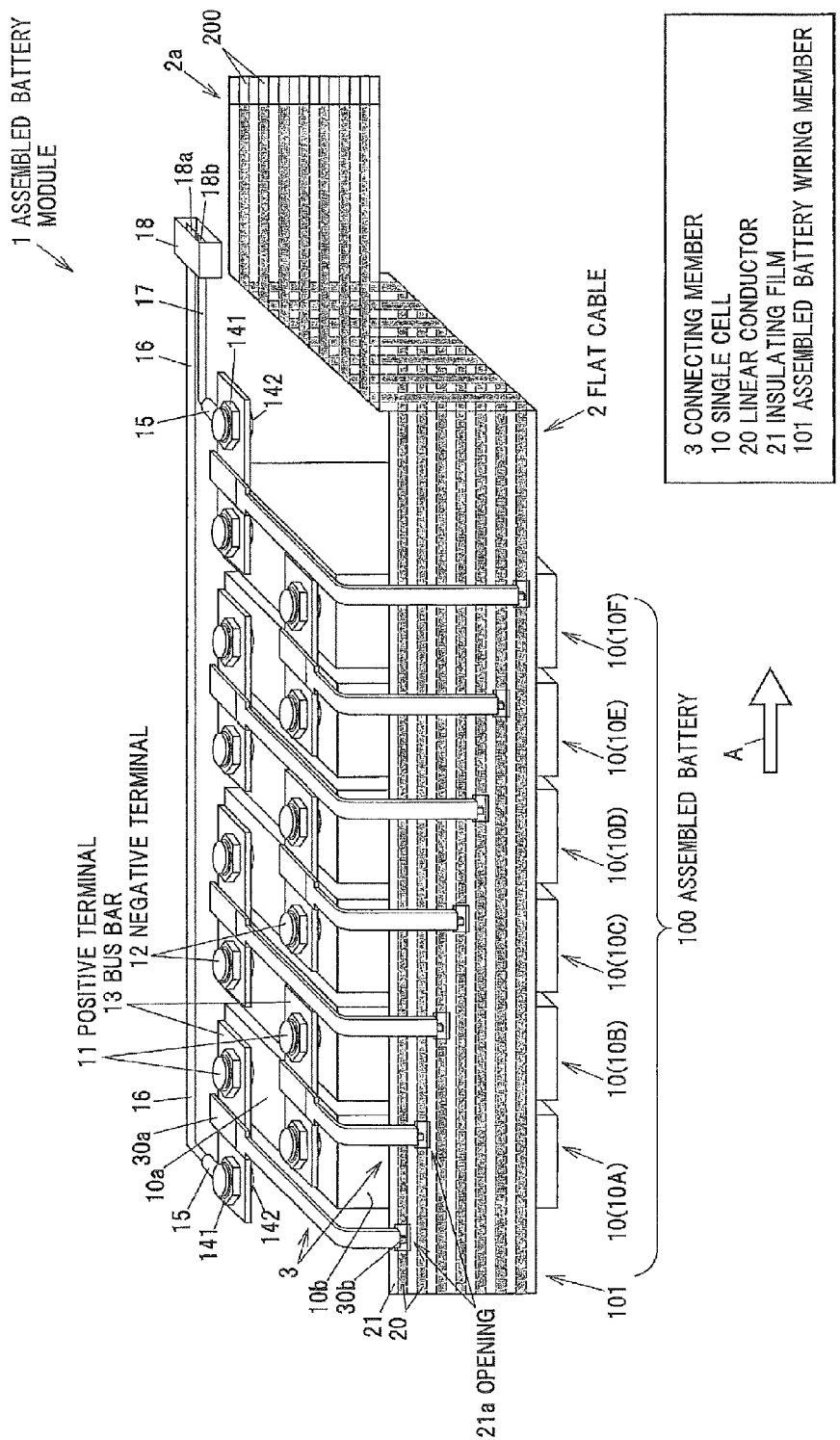
FIG. 1 is a structural diagram illustrating a structural example of an assembled battery wiring member and an assembled battery module provided therewith in a first embodiment.

FIG. 1 is a structural diagram illustrating a structural example of an assembled battery wiring member 101 and an assembled battery module 1 provided therewith in the first embodiment.

Structure of the Assembled Battery Module 1

The assembled battery module 1 is provided with an assembled battery 100 composed of plural (six) single cells 10 and the assembled battery wiring member 101 provided on the assembled battery 100.

The assembled battery 100 is configured such that plural single cells 10 each having a positive terminal 11 and a negative terminal 12 are arranged in along array direction indicated by an arrow-A and the positive terminal 11 of one of a pair of single cells 10 adjacent in the array direction is connected to the negative terminal 12 of another single cell 10 one after another, each by a bus bar 13 as a coupling member.

Although the plural single cells 10 are in the same size of rectangular parallelepiped shape and have the same function and capacity, the single cell 10 arranged on one end in the array direction (on the left side in FIG. 1) will be explained as a first single cell 10A and other single cells 10 will be explained as second to sixth single cells 10B to 10F sequentially from the first single cell 10A side toward another end in the following description if it is necessary to distinctively explain the respective single cells 10.

The single cell 10 is a rechargeable battery (secondary battery) of, e.g., lithium-ion battery or nickel-metal-hydride battery and stores power to be supplied to, e.g., an electric motor as a driving source for moving a vehicle. The single cell 10 discharges when running the vehicle by the electric motor, and is charged with regenerative electric power of the electric motor or power supplied from the outside of the vehicle.

A positive-side wire 16 is connected to the bus bar 13 which is connected to the positive terminal 11 of the first single cell 10A. In more detail, a connecting terminal 15 connected to one end of the positive-side wire 16 is connected to the bus bar 13 by a nut 141 and a bolt 142. Likewise, one end of a negative-side wire 17 is connected to the bus bar 13 which is connected to the negative terminal 12 of the sixth single cell 10F.

Other ends of the positive-side wire 16 and the negative-side wire 17 are connected to terminals 18a and 18b of a connector 18. The connector 18 is connected to, e.g., an inverter mounted on the vehicle.

Structure of the Assembled Battery Wiring Member 101

Figure 2:
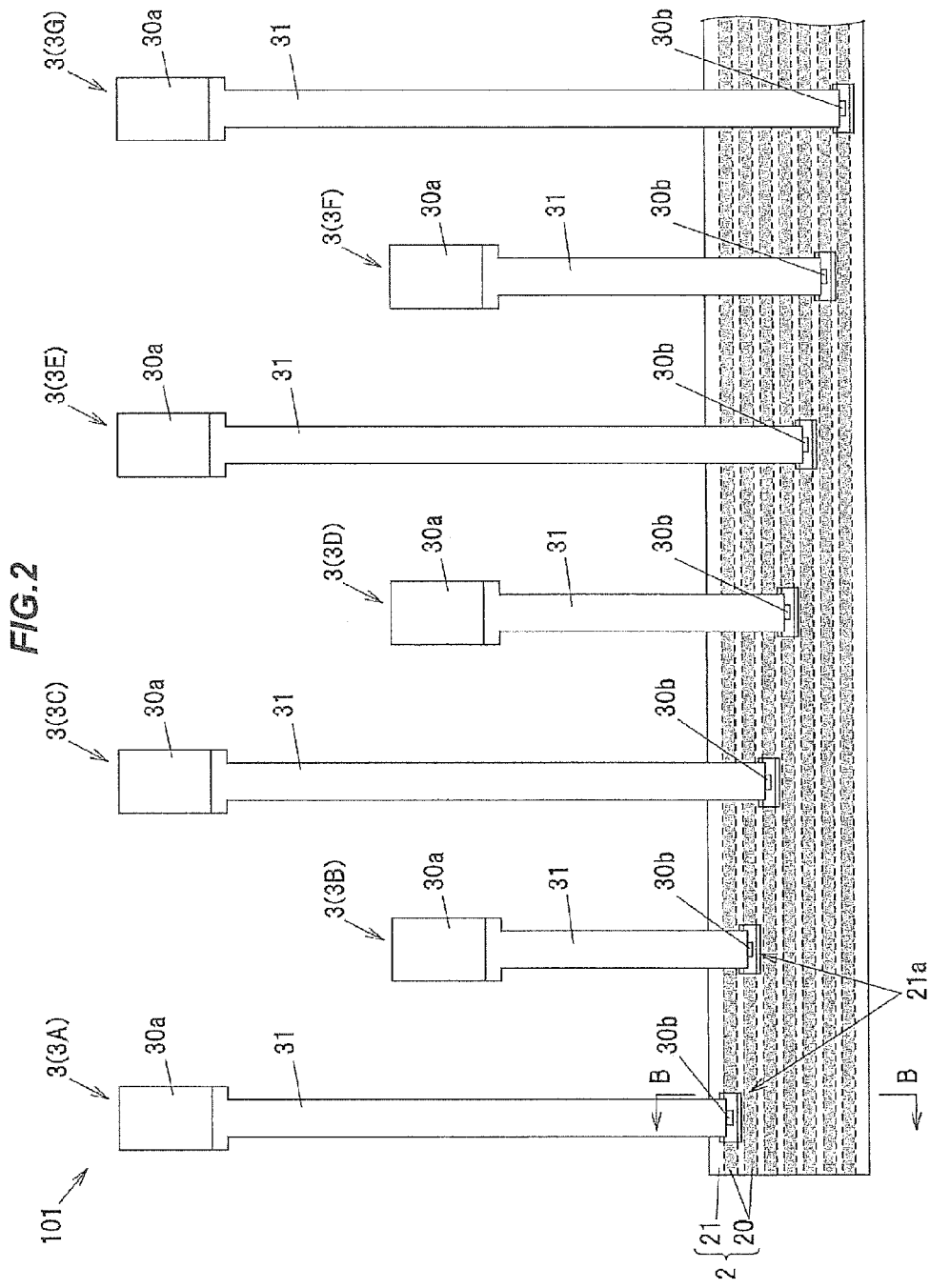
FIG. 2 is a plan view showing a major portion of the assembled battery wiring member.
Figure 3:
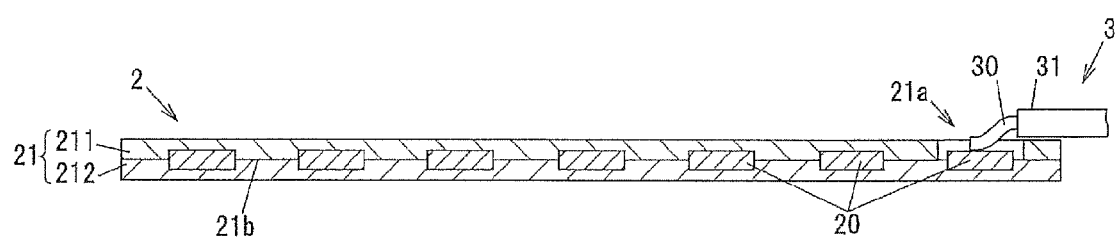
FIG. 3 is a cross sectional view taken on line B-B in FIG. 2.

FIG. 2 is a plan view showing a major portion of the assembled battery wiring member 101. FIG. 3 is a cross sectional view taken on line B-B in FIG. 2.

The assembled battery wiring member 101 is provided with a belt-like flat cable 2 and plural connecting members 3. In the first embodiment, one-side end portions 30a of seven connecting members 3 are connected to the bus bars 13 (see FIG. 1) and other-side end portions 30b are connected to the flat cable 2.

The plural connecting members 3 have different lengths but the remaining structure is the same. In the following description, the connecting member 3 connecting the flat cable 2 to the bus bar 13 connected to the positive-side wire 16 will be explained as a connecting member 3A and other sequential connecting members 3 will be explained as second to seventh connecting members 3B to 3G if it is necessary to distinctively explain the respective connecting members 3.

Structure of the Flat Cable 2

The flat cable 2 has plural (seven) parallel linear conductors 20 and an insulating film 21 covering the linear conductors 20 all together. In FIGS. 1 and 2, portions of the linear conductors 20 covered with the insulating film 21 are shown in grey.

Terminal areas 200 in which the linear conductors 20 are exposed by partially removing the insulating film 21 are formed at an end portion 2a of the flat cable 2. The terminal areas 200 are connected to, e.g., a non-illustrated control unit which monitors voltage, etc., and controls charge and discharge of the single cells 10.

As shown in FIG. 3, the plural linear conductors 20 are lined up in a direction orthogonal to an extending direction thereof. The insulating film 21 is composed of a first insulating film 211 and a second insulating film 212, and the plural linear conductors 20 are sandwiched between the first insulating film 211 and the second insulating film 212. The first insulating film 211 and the second insulating film 212 are tightly bonded and integrated to each other at an interface 21b.

Openings 21a are formed on the first insulating film 211 at plural (seven) positions corresponding to the respective linear conductors 20. The openings 21a are formed by removing a portion of the first insulating film 211 using, e.g., laser, etc.

The linear conductors 20 are exposed to the outside via the openings 21a and the other-side end portions 30b of the connecting members 3 are connected to the exposed linear conductors 20.

In addition, the flat cable 2 is arranged so that the second insulating film 212 faces a second side surface 10b of the single cell 10 which intersects with a first side surface 10a (see FIG. 1) having the positive terminal 11 and the negative terminal 12 provided thereon. In the first embodiment, since the single cell 10 has a rectangular parallelepiped shape, the first side surface 10a and the second side surface 10b are adjacent and orthogonal to each other. In other words, the flat cable 2 is arranged so that the width direction thereof orthogonally intersects with the first side surface 10a and the second insulating film 212 located on the opposite side to the first insulating film 211 having the openings 21a faces the second side surface 10b. Accordingly, the connecting members 3 are bent along the first side surface 10a and the second side surface 10b.

Structure of the Connecting Member 3

FIGS. 4A to 4D show a structural example of the connecting member 3, wherein FIG. 4A is a plan view and FIG. 4B is a side view. Also, FIG. 4C is a plan view showing a conductor 30 constituting the connecting member 3 and FIG. 4D is a plan view showing first and second insulation portions 311 and 312 constituting the connecting member 3. Here, the connecting member 3B of the plural connecting members 3 will be specifically taken as an example for explanation. It should be noted that a dimension in a thickness direction is exaggeratingly depicted in FIG. 4B for the purpose of clarifying the description.

As shown in FIGS. 4A and 4B, the connecting member 3 is formed by covering a plate-like flexible conductor 30 with an insulation 31. The conductor 30 is formed of, e.g., a metal having good conductivity such as copper and is, e.g., stamped by a press. The insulation 31 is formed by integrally joining the first insulation portion 311 located on a plane surface of the conductor 30 side to the second insulation portion 312 located on another plane surface side. In FIGS. 4A and 4B, a shape of the conductor 30 inside the insulation 31 is indicated by a dashed line.

The conductor 30 has a middle portion 30c which is provided between the one-side end portion 30a and the other-side end portion 30b, as shown in FIG. 4C. Furthermore, the middle portion 30c has a wide portion 30d on the one-side end portion 30a side and a narrow portion 30e on the other-side end portion 30b side.

The first insulation portion 311 and the second insulation portion 312 have a shape corresponding to the wide portion 30d and the narrow portion 30e and are formed so as to cover the entire middle portion 30c. The first insulation portion 311 and the second insulation portion 312 are bonded to each other at both sides in a width direction which is orthogonal to an extending direction of the middle portion 30c. The one-side end portion 30a and the other-side end portion 30b of the conductor 30 are not covered with the first insulation portion 311 and the second insulation portion 312 and are thus exposed from the insulation 31.

The one-side end portion 30a is connected to the bus bar 13. The other-side end portion 30b is connected to the linear conductor 20 through the opening 21a formed on the first insulating film 211 of the flat cable 2. It is possible to connect the one-side end portion 30a to the bus bar 13 and the other-side end portion 30b to the linear conductor 20 by, e.g., resistance welding, ultrasonic welding or soldering, etc.

Functions of the Assembled Battery Wiring Member 101

In the assembled battery wiring member 101 configured as described above, the one-side end portions 30a of seven connecting members 3 (the connecting members 3A to 3G) are respectively connected to seven bus bars 13. The non-illustrated control unit connected to the end portion 2a of the flat cable 2 can detect output voltage of the first single cell 10A by measuring a potential difference between the linear conductor 20 connected to the connecting member 3A and the linear conductor 20 connected to the connecting member 3B. Likewise, the control unit can detect output voltages of the single cells 10B and 10F by measuring respective potential differences between the linear conductors 20 connected to the connecting members 3B to 3G. Accordingly, the assembled battery wiring member 101 allows voltage of the plural single cells 10 to be measured via the flat cable 2 and the plural connecting members 3.

Note that, when output voltage of any of the single cells 10A and 10F shows an abnormal value or variation in output voltage thereof is large, the control unit can suppress the variation in output voltage by outputting a signal indicating abnormality or by temporarily discharging the single cells 10A and 10F.

Functions and Effects of the First Embodiment

In the first embodiment, since the bus bar 13 is connected to the linear conductor 20 of the flat cable 2 by the connecting member 3, it is not necessary to increase the size of the bus bar unlike the case of directly connecting the bus bar to the conductor of the flat cable as is described in, e.g., JP-A-2011-210711. In other words, since it is possible to connect the one-side end portion 30a of the connecting member 3 to the bus bar 13 at a position between the positive terminal 11 and the negative terminal 12, a space for connecting the connecting member 3 does not need to be provided on the bus bar 13. In addition, since it is not necessary to slit up the flat cable between the conductors unlike, e.g., JP-A-2010-114025, it is possible to maintain strength of the flat cable 2.

In addition, since the flat cable 2 is arranged so as to face the second side surface 10b of the single cell 10, it is possible to reduce the size of the assembled battery module 1 in a width direction (a normal direction of the second side surface 10b of the single cell 10) as compared to the case where the flat cable 2 is arranged in parallel to the first side surface 10a.

Furthermore, the connecting member 3 is flexible. Therefore, even if, e.g., a space between adjacent single cells 10 changes due to, e.g., expansion caused by heat of the single cells 10, the change in the space is absorbed by deflection of the connecting member 3 and it is possible to avoid tension which acts on the flat cable 2 (a force of pulling the flat cable 2 in an extending direction thereof). In addition, even when the space between the single cells 10 becomes larger than a designed value due to an assembly error, etc., of the single cell 10, it is possible to absorb the error of the space by the deflection of the connecting member 3 in the same manner.

Second Embodiment

Next, the second embodiment of the invention will be described in reference to FIGS. 5A and 5B.

Figure 5A:
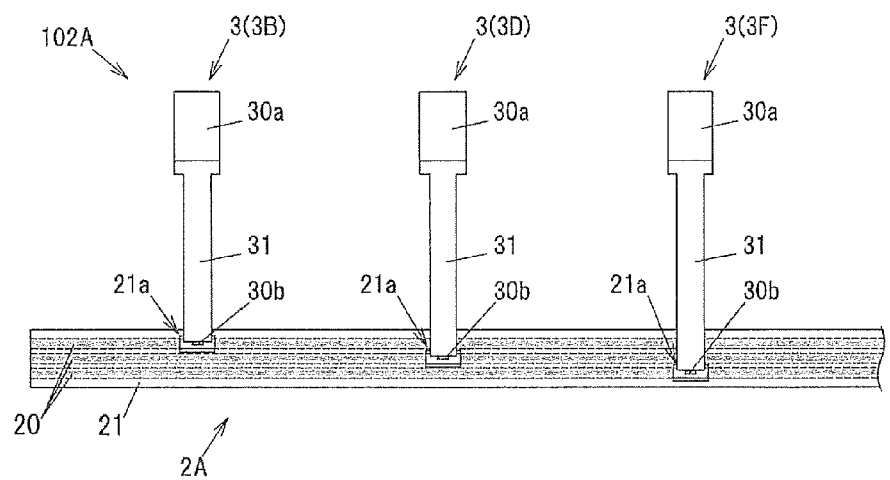
FIGS. 5A and 5B are plan views showing a major portion of first and second assembled battery wiring members in a second embodiment.
Figure 5B:
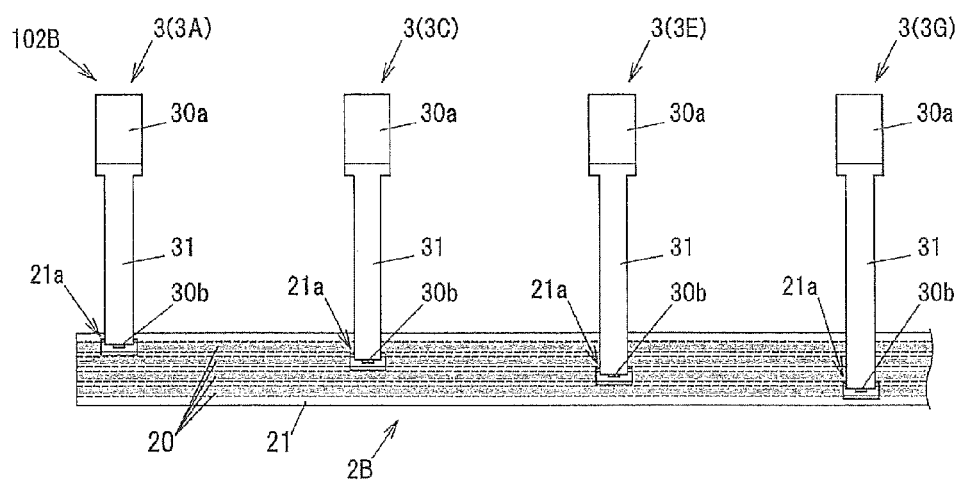

FIG. 5A is a plan view showing a major portion of a first assembled battery wiring member 102A in the second embodiment and FIG. 5B is a plan view showing a major portion of a second assembled battery wiring member 102B in the second embodiment. It should be noted that constituent elements having the same functions as those described in the first embodiment are denoted by the same reference numerals in FIGS. 5A and 5B and an overlapped explanation thereof will be omitted.

Although the assembled battery module 1 provided with one flat cable 2 to which the seven connecting members 3 are connected has been described in the first embodiment, the functions of the assembled battery wiring member 101 in the first embodiment is realized by the first assembled battery wiring member 102A and the second assembled battery wiring member 102B in the second embodiment.

The first assembled battery wiring member 102A has a flat cable 2A and plural (three) connecting members 3 (the connecting members 3B, 3D and 3F). In the flat cable 2A, three linear conductors 20 are covered with the insulating film 21. In addition, plural openings 21a formed by removing the insulating film 21 are formed on the flat cable 2A and the respective other-side end portions 30b of the connecting members 3B, 3D and 3F are connected to the linear conductors 20 through the openings 21a.

The second assembled battery wiring member 102B has a flat cable 2B and plural (four) connecting members 3 (the connecting members 3A, 3C, 3E and 3G). In the flat cable 2B, four linear conductors 20 are covered with the insulating film 21. In addition, plural openings 21a formed by removing the insulating film 21 are formed on the flat cable 2B and the respective other-side end portions 30b of the connecting members 3A, 3C, 3E and 3G are connected to the linear conductors 20 through the openings 21a.

The same functions and effects as those in the first embodiment are obtained also in the second embodiment. In addition, by arranging the flat cable 2A so as to face the second side surface 10b (see FIG. 1) of the assembled battery 100 while arranging the flat cable 2B so as to face a side surface of the assembled battery 100 opposite to the second side surface 10b, the lengths of the connecting members 3A, 3C, 3E and 3G of the second assembled battery wiring member 102B can be shorter than that in the first embodiment while suppressing expansion of the widthwise size of the assembled battery module 1.

Alternatively, the flat cables 2A and 2B of the first assembled battery wiring member 102A and the second assembled battery wiring member 102B may be arranged so as to face the first side surface 10a of the assembled battery 100. In this case, it is possible to further shorten the lengths of the connecting members 3A to 3G and to further reduce the widthwise size of the entire assembled battery module 1 including the flat cables 2A and 2B.

Third Embodiment

Next, the third embodiment of the invention will be described in reference to FIGS. 6 to 7E.

FIG. 6 is a plan view showing a major portion of an assembled battery wiring member 103 in the third embodiment. The assembled battery wiring member 103 has connecting members 4 (connecting members 4A to 4G) in place of the connecting members 3 (the connecting members 3A to 3G) of the first embodiment. The connecting member 4 is different from the connecting member 3 in the configuration that a fuse 91 as an example of an electronic component is mounted, and the remaining configuration and functions of the connecting member 4 are the same as the connecting member 3.

In the assembled battery wiring member 103, plural (seven) connecting members 4 (the connecting members 4A to 4G) are connected to linear conductors 20 of a flat cable 2C which is formed by covering the plural (seven) linear conductors 20 with the insulating film 21. Each connecting member 4 has a one-side end portion 40a connected to the bus bar 13 and another-side end portion 40b connected to the linear conductor 20 through the opening 21a formed on the flat cable 2C, and the fuse 91 is mounted between the one-side end portion 40a and the other-side end portion 40b.

FIGS. 7A to 7E show a structural example of the connecting member 4 (the connecting member 4B), wherein FIG. 7A is a plan view and FIG. 7B is a side view. Also, FIG. 7C is a plan view showing a conductor 40 constituting the connecting member 4 and FIGS. 7D and 7E are plan views showing first and second insulation portions 411 and 412 constituting the connecting member 4.

The conductor 40 is divided into plural conductor portions (a first conductor portion 401 and a second conductor portion 402) and the fuse 91 is interposed between the first conductor portion 401 and the second conductor portion 402.

As shown in FIG. 7C, in the conductor 40, a middle portion 40c between the one-side end portion 40a and the other-side end portion 40b is composed of a wide portion 40d, a first narrow portion 40e and a second narrow portion 40f and a gap 40g is formed between the first narrow portion 40e and the second narrow portion 40F. The wide portion 40d and the first narrow portion 40e are provided on the first conductor portion 401 and the second narrow portion 40f is provided on the second conductor portion 402. In other words, the first conductor portion 401 integrally has the one-side end portion 40a, the wide portion 40d and the first narrow portion 40e, the second conductor portion 402 integrally has the second narrow portion 40f and the other-side end portion 40b and the gap 40g is formed between first conductor portion 401 and the second conductor portion 402.

As shown in FIG. 7D, a first opening 41a and a second opening 41b are formed on the first insulation portion 411. The first opening 41a is formed at a position corresponding to an end portion of the first narrow portion 40e on the gap 40g side. Meanwhile, the second opening 41b is formed at a position corresponding to an end portion of the second narrow portion 40f on the gap 40g side. Alternatively, the first opening 41a and the second opening 41b may be integrally formed.

As shown in FIG. 7E, the second insulation portion 412 is formed in the same shape and size as the first insulation portion 411 except that openings equivalent of the first opening 41a and the second opening 41b are not provided.

As shown in FIG. 7B, the first insulation portion 411 and the second insulation portion 412 are joined so as to sandwich the conductor 40 and integrally form an insulation 41. The insulation 41 covers the middle portion 40c among the respective portions of the conductor 40. Meanwhile, the first narrow portion 40e is partially exposed from the first opening 41a of the insulation 41 (the first insulation portion 411) and also the second narrow portion 40f is partially exposed from the second opening 41b.

As shown in FIG. 6, the fuse 91 integrally has a main body 910 and connecting portions 911 and 912. The main body 910 is formed of a low-melting-point conductive metal consisting mainly of, e.g., lead, tin, bismuth or cadmium, etc. The connecting portions 911 and 912 are provided on both edges of the main body 910 such that the connecting portion 911 is connected to the end portion of the first narrow portion 40e exposed from the first opening 41a and the connecting portion 912 is connected to the end portion of the second narrow portion 40f exposed from the second opening 41b. The connections therebetween can be made by, e.g., soldering.

In the third embodiment, in addition to the functions and effects of the first embodiment, it is possible to prevent, e.g., the linear conductors 20 of the flat cable 2C from being heated or the control unit form being damaged since the fuse 91 is melted down when a current above a predetermined level flows through the conductor 40 of the connecting member 4 due to, e.g., abnormality, etc., of the single cell 10.

Fourth Embodiment

Next, the fourth embodiment of the invention will be described in reference to FIG. 8.

FIG. 8 is a plan view showing a major portion of an assembled battery wiring member 104 in the fourth embodiment. The assembled battery wiring member 104 is provided with a flat cable 2D and plural connecting members 5. In addition to the fuse 91, a temperature sensor 92 is mounted as an electronic component on the connecting member 5. The temperature sensor 92 integrally has a main body 920 and connecting portions 921 and 922. The main body 920 is, e.g., a thermistor in which a resistance value varies depending on temperature.

Note that, the assembled battery wiring member 104 is equivalent of the second assembled battery wiring member 102B in the second embodiment, and a wiring connecting member having three connecting members 5 is separately required when the assembled battery wiring member 104 is used for the assembled battery 100 in which six single cells 10 are connected in series.

The flat cable 2D is composed of twelve linear conductors 20 and the insulating film 21 covering the linear conductors 20 all together. Plural openings 21a from which the linear conductors 20 are partially exposed are formed on the insulating film 21.

The connecting member 5 is formed by covering a conductor 50 with an insulation 51, and the conductor 50 has a one-side end portion 50a connected to the bus bar 13 and other-side end portions 50b, 50c and 50d connected to the linear conductors 20 through the openings 21a on the insulating film 21 of the flat cable 2D. The other-side end portions 50b, 50c and 50d are respectively connected to three linear conductors 20 which are arranged in a width direction of the flat cable 2D.

The insulation 51 covers the conductor 50 except the one-side end portion 50a and the other-side end portions 50b, 50c and 50d and has first to fourth openings 51a to 51d formed to expose a portion of the conductor 50.

The conductor 50 is divided into four conductor portions (first to fourth conductor portions 501 to 504). The first conductor portion 501 includes the one-side end portion 50a and is connected to the connecting portion 911 of the fuse 91 through the opening 51a. The second conductor portion 502 includes the other-side end portion 50b and is connected to the connecting portion 912 of the fuse 91 through the opening 51b. The third conductor portion 503 includes the other-side end portion 50c and is connected to the connecting portion 921 of the temperature sensor 92 through the opening 51c. In addition, the fourth conductor portion 504 includes the other-side end portion 50d and is connected to the connecting portion 922 of the temperature sensor 92 through the opening 51d.

The fuse 91 is interposed between the first conductor portion 501 and the second conductor portion 502 and is melted down when a current above a predetermined level flows therethrough. Meanwhile, predetermined bias voltage is applied to the temperature sensor 92 by the third conductor portion 503 and the fourth conductor portion 504, and a current flowing between the connecting portions 921 and 922 is changed due to variation in a resistance value of the main body 920 according to surrounding ambient temperature. The control unit connected to an end portion of the flat cable 2D detects overheating of the single cell 10 by monitoring the change in the current and takes action against abnormality by, e.g., outputting a signal indicating occurrence of abnormality.

In the fourth embodiment, in addition to the functions and effects of the third embodiment, it is possible to detect overheating, etc., of the single cell 10 by mounting the temperature sensor 92 on the connecting member 5.

Alternatively, it may be modified such that the first conductor portion 501 and the second conductor portion 502 are formed in one piece and the fuse 91 is not mounted on the connecting member 5. In this case, only the temperature sensor 92 is mounted as an electronic component on the connecting member 5. Also in this modification, it is possible to detect overheating, etc., of the single cell 10 by the temperature sensor 92.

Fifth Embodiment

Next, the fifth embodiment of the invention will be described in reference to FIGS. 9 and 10.

FIG. 9 is a plan view showing a major portion of an assembled battery wiring member 105 in the fifth embodiment. The assembled battery wiring member 105 is provided with the flat cable 2D and plural connecting members 5A. The fuse 91 and the temperature sensor 92 are mounted on the connecting member 5A in the same manner as the connecting member 5 of the fourth embodiment but the shape of an insulation 51A is different from that of the connecting member 5. Since the remaining structure of the connecting member 5A is the same as the connecting member 5, constituent elements having the same functions as those described in the fourth embodiment are denoted by the same reference numerals and an overlapped explanation thereof will be omitted.

Figure 10A:
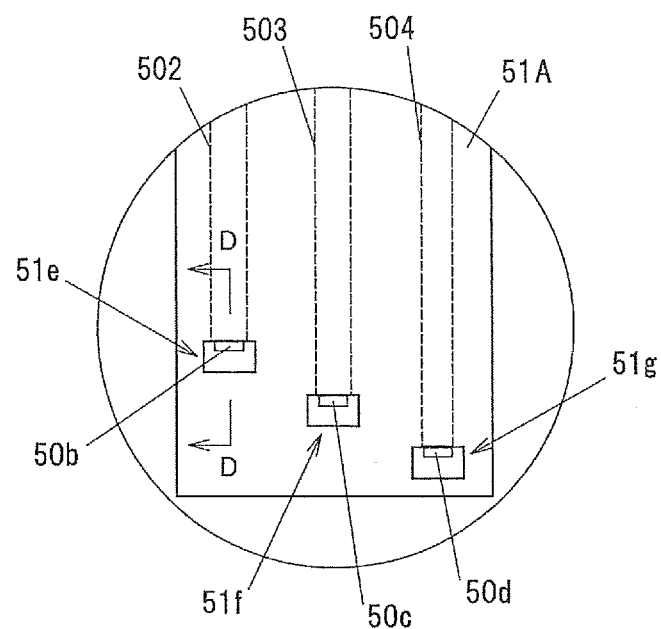
FIG. 10A is an enlarged view showing a portion C in FIG. 9
Figure 10B:
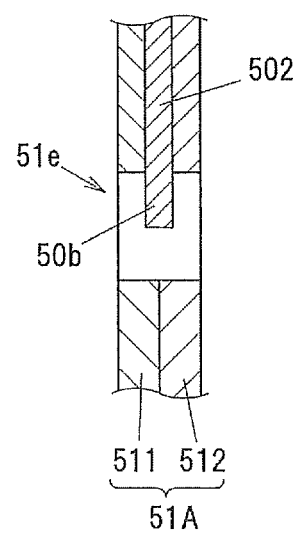
FIG. 10B is a cross sectional view taken on line D-D in FIG. 10A.

FIG. 10A is an enlarged view showing a portion C in FIG. 9 and FIG. 10B is a cross sectional view taken on line D-D in FIG. 10A.

As shown in FIG. 10A, three openings 51e, 51f and 51g are formed on the connecting member 5A at positions corresponding to the other-side end portions 50b, 50c and 50d. As shown in FIG. 10B, the insulation 51A is formed by bonding a first insulation 511 to a second insulation 512 and the openings 51e, 51f and 51g are formed to penetrate through the first insulation 511 and the second insulation 512.

For connecting the other-side end portions 50b, 50c and 50d to the linear conductors 20, for example, an ultrasonic horn is inserted into the opening 51e, 51f or 51g for ultrasonic welding of the other-side end portion 50b, 50c or 50d to the linear conductor 20. Alternatively, the other-side end portions 50b, 50c and 50d may be soldered to the linear conductors 20 via the openings 51e, 51f and 51g.

Note that, the openings 51e, 51f and 51g may not be formed on one of the first insulation 511 and the second insulation 512 which does not face the linear conductors 20 as long as it is possible to connect the other-side end portions 50b, 50c and 50d to the linear conductors 20. For example, when the second insulation 512 faces the flat cable 2D, the openings 51e, 51f and 51g are formed on the second insulation 512 and may not be formed on the first insulation 511. In this case, for example, solder cream is filled into the openings 51e, 51f and 51g or the openings 21a of the flat cable 2D and is heated after the flat cable 2D and the connecting members 5A are arranged face-to-face, and it is thereby possible to electrically connect the other-side end portions 50b, 50c and 50d to the linear conductors 20.

The same functions and effects as those in the fourth embodiment are obtained also in the fifth embodiment.

Sixth Embodiment

Next, the sixth embodiment of the invention will be described in reference to FIG. 11.

Figure 11:
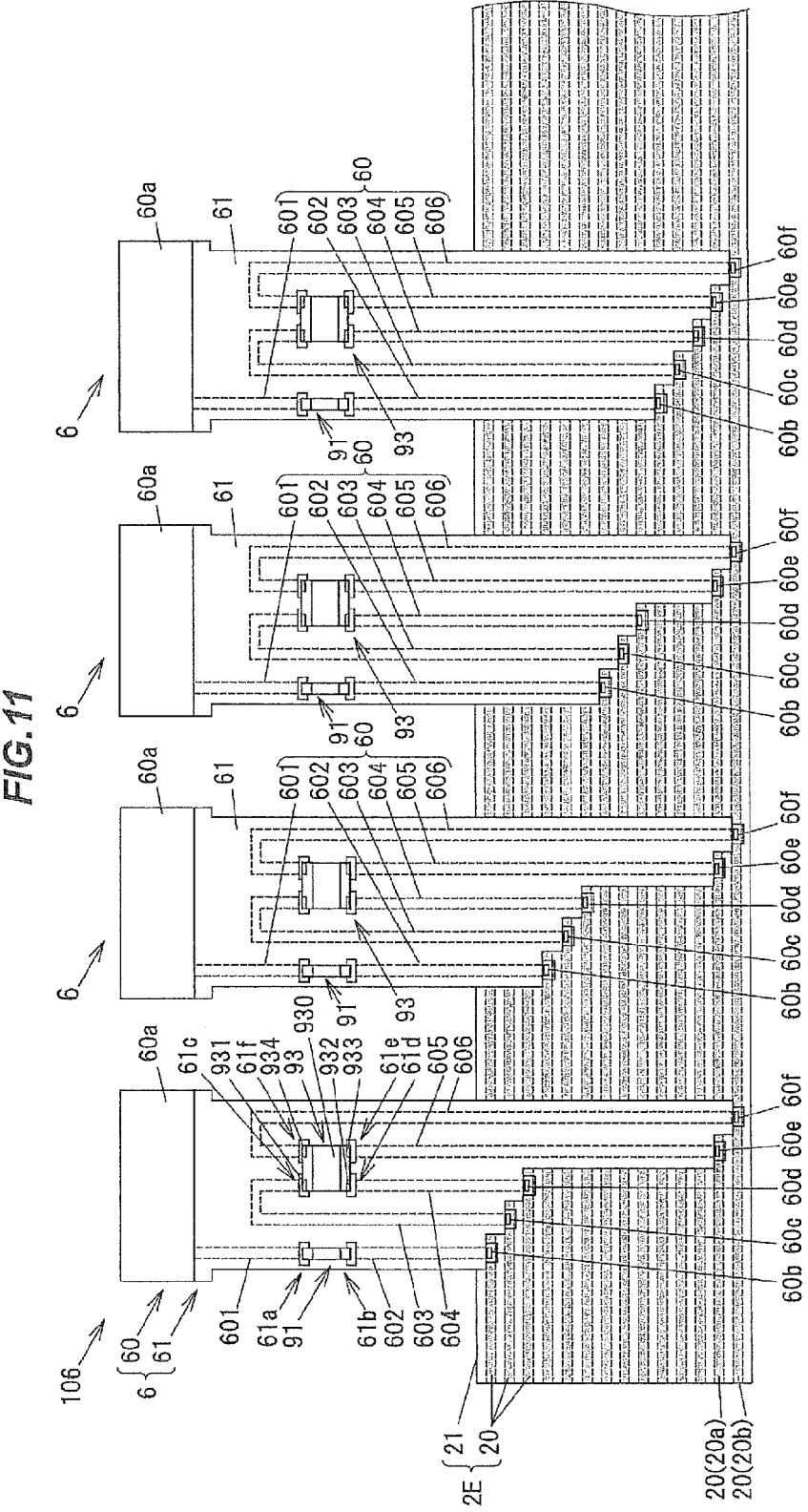
FIG. 11 is a plan view showing a major portion of an assembled battery wiring member in a sixth embodiment.

FIG. 11 is a plan view showing a major portion of an assembled battery wiring member 106 in the sixth embodiment. The assembled battery wiring member 106 is provided with a flat cable 2E and plural connecting members 6.

The connecting member 6 has a conductor 60 and an insulation 61 covering the conductor 60, and mounts the fuse 91 and an active element 93. The active element 93 is an electronic component which is operated by receiving power supply and is, e.g., a temperature sensor having a signal amplification function. In addition, the active element 93 integrally has a main body 930 and connecting portions 931 to 934. The connecting portions 931 to 934 are provided at four corners of the rectangular main body 930 in the example shown in FIG. 11.

The flat cable 2E is composed of fourteen linear conductors 20 and the insulating film 21 covering the linear conductors 20 all together. Plural openings 21a from which the linear conductors 20 are exposed are formed on the insulating film 21.

In addition, two of the fourteen linear conductors 20 are connected to, e.g., a DC power source of the control unit and function as power wires 20a and 20b for supplying power to operate the active element 93. In the example shown in FIG. 11, two linear conductors 20 located at a widthwise edge of the flat cable 2E are the power wires 20a and 20b. Voltage of power supplied by the power wires 20a and 20b is, e.g., DC5V.

The conductor 60 of the connecting member 6 has a one-side end portion 60a connected to the bus bar 13 and other-side end portions 60b to 60f connected to the linear conductors 20 through the openings 21a on the insulating film 21 of the flat cable 2E. The other-side end portions 60b to 60d are respectively connected to three linear conductors 20 arranged in a width direction of the flat cable 2E. In addition, the other-side end portion 60e is connected to the power wire 20a and the other-side end portion 60f is connected to the power wire 20b.

Openings 61a to 61f are formed on the insulation 61 at positions corresponding to the connecting portions 911 and 912 of the fuse 91 and the connecting portions 931 to 934 of the active element 93.

The conductor 60 is divided into six conductor portions (first to sixth conductor portions 601 to 606). The first conductor portion 601 includes the one-side end portion 60a connected to the bus bar 13 and is connected to the connecting portion 911 of the fuse 91 through the opening 61a. The second conductor portion 602 includes the other-side end portion 60b and is connected to the connecting portion 912 of the fuse 91 through the opening 61b.

In addition, the third conductor portion 603 includes the other-side end portion 60c and is connected to the connecting portion 931 of the active element 93 through the opening 61c. The fourth conductor portion 604 includes the other-side end portion 60d and is connected to the connecting portion 932 of the active element 93 through the opening 61d. The fifth conductor portion 605 includes the other-side end portion 60e and is connected to the connecting portion 933 of the active element 93 through the opening 61e. The sixth conductor portion 606 includes the other-side end portion 60f and is connected to the connecting portion 934 of the active element 93 through the opening 61f.

Among the other-side end portions 60b to 60f, the other-side end portions 60b to 60d of the plural connecting members 6 are connected to the linear conductors 20 all different from one another and the other-side end portions 60e or 60f are connected to the common linear conductor 20 (the power wire 20a or 20b). In other words, the other-side end portions 60e of the plural connecting members 6 are connected to the common power wire 20a and the other-side end portions 60f of the plural connecting members 6 are connected to the common power wire 20b.

The active element 93 is operated by power supplied from the connecting portions 933 and 934 and inputs/outputs signals via the connecting portions 931 and 932.

In the sixth embodiment, in addition to the functions and effects of the third embodiment, signal which indicates, e.g., temperature around the active element 93 can be amplified and transmitted to the control unit since the active element 93 operated by receiving power supply is mounted on the connecting member 6. This allows high temperature, etc., to be accurately detected.

Seventh Embodiment

Next, the seventh embodiment of the invention will be described in reference to FIG. 12.

Figure 12:
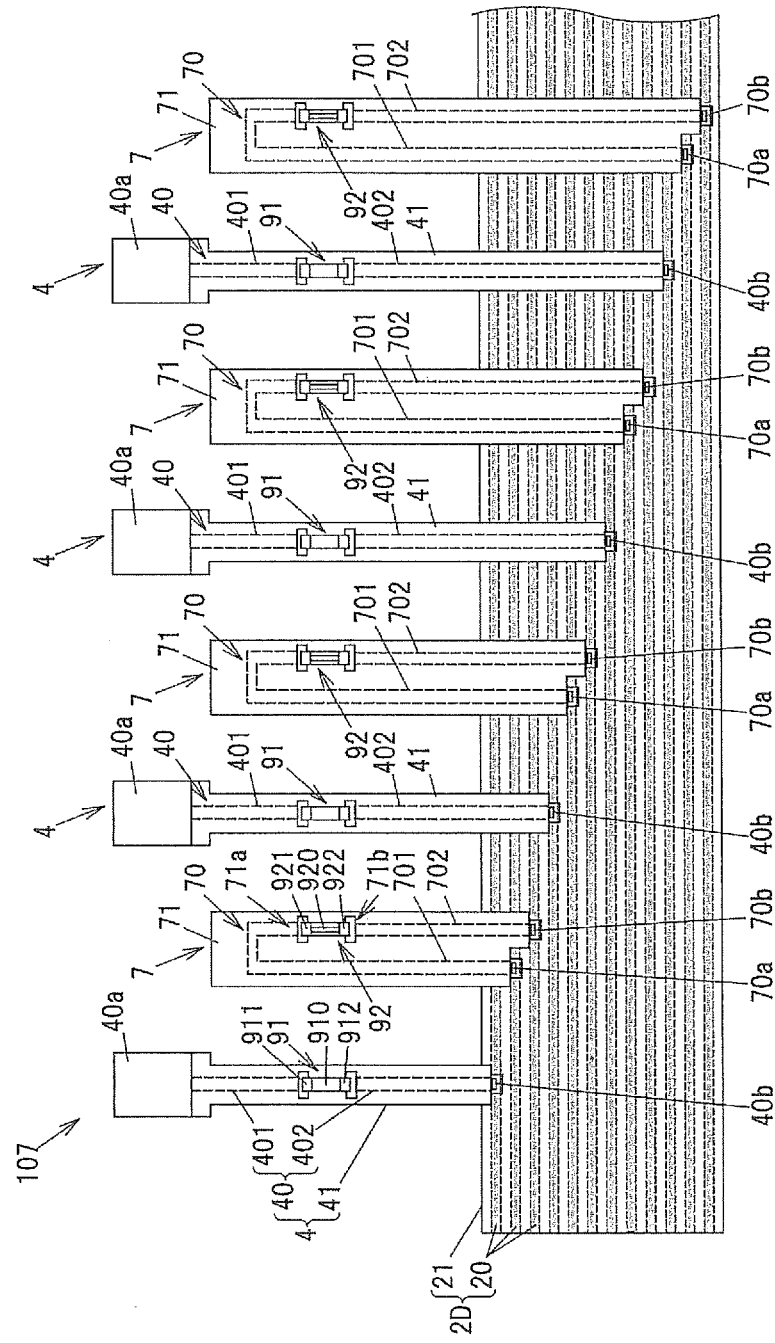
FIG. 12 is a plan view showing a major portion of an assembled battery wiring member in a seventh embodiment.

FIG. 12 is a plan view showing a major portion of an assembled battery wiring member 107 in the seventh embodiment. The assembled battery wiring member 107 is provided with the flat cable 2D, plural connecting members 4 and plural component mounting members 7. The component mounting member 7 mounts the temperature sensor 92. The flat cable 2D and the temperature sensor 92 are the same as those described in the fourth embodiment. The connecting member 4 is the same as that described in the third embodiment.

The component mounting member 7 has a conductor 70 and an insulation 71 covering the conductor 70. The conductor 70 is divided into a first conductor portion 701 and a second conductor portion 702, and the temperature sensor 92 is mounted between the first conductor portion 701 and the second conductor portion 702. The connecting portion 921 of the temperature sensor 92 is connected to an end portion of the first conductor portion 701 through an opening 71a formed on the insulation 71 and the connecting portion 922 of the temperature sensor 92 is connected to an end portion of the second conductor portion 702 through an opening 71b formed on the insulation 71.

Another-side end portion 70a of the first conductor portion 701 is connected to a linear conductor 20 through the opening 21a formed on the insulating film 21 of the flat cable 2D. Meanwhile, another-side end portion 70b of the second conductor portion 702 is connected to another linear conductor 20, which is adjacent to the linear conductor 20 connected to the other-side end portion 70a, through the opening 21a formed on the insulating film 21 of the flat cable 2D.

The temperature sensor 92 operates in the same manner as in the fourth embodiment. In other words, a current flowing between the connecting portions 921 and 922 is changed due to variation in a resistance value of the main body 920 according to surrounding ambient temperature, which allows the control unit to detect overheating of the single cell 10.

In addition, in the seventh embodiment, since the connecting member 4 and the component mounting member 7 are separate components, the temperature sensor 92 mounted on the component mounting member 7 can be brought much closer to the single cell 10. This allows temperature of the single cell 10 to be detected more accurately.

Figure 13:
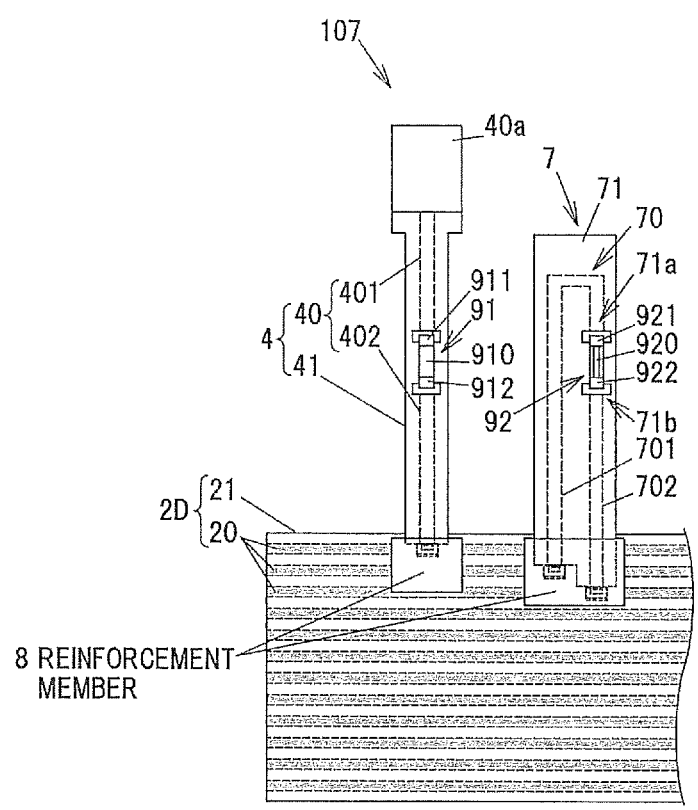
FIG. 13 is a plan view showing a modification of the assembled battery wiring member in the seventh embodiment in which a reinforcement member is added.

Alternatively, connecting portions of the connecting member 4 and the component mounting member 7 to the flat cable 2D may be reinforced by a reinforcement member 8, as shown in FIG. 13. In FIG. 13, end portions of the connecting member 4 and the component mounting member 7 on the back side of the reinforcement member 8 are indicated by a dashed line.

As the reinforcement member 8, it is possible to use, e.g., an insulating film. In this case, the insulating film as the reinforcement member 8 may be bonded to the flat cable 2D and the connecting member 4 or the component mounting member 7 by a bonding agent or the reinforcement member 8 may be adhered to the connecting portion by an adhesive provided on one side of the reinforcement member 8. In addition, the connecting portions of the connecting member 4 and the component mounting member 7 to the flat cable 2D may be reinforced by applying a resin or by resin printing.

Although the embodiments of the invention have been described, the invention according to claims is not to be limited to the above-mentioned embodiments. Further, please note that all combinations of the features described in the embodiments are not necessary to solve the problem of the invention.

In addition, the invention is not limited to the first to seventh embodiments and can be implemented in various forms without departing from the gist thereof.

Although the case of using the assembled battery wiring members 101 to 107 for the assembled battery 100 which stores power for, e.g., moving a vehicle has been described in the embodiments, the intended use of the assembled battery 100 is not limited thereto. In addition, the invention is applicable as long as two or more single cells 10 are used in the assembled battery 100.

Technical Ideas Induced from the Above Embodiments

Here, the technical ideas understood from the above embodiments will be described below.

(1) An assembled battery wiring member provided on an assembled battery configured such that plural single cells each having a positive terminal and a negative terminal are arranged in a predetermined array direction and the positive terminal of one of a pair of single cells adjacent in the array direction is connected to the negative terminal of another single cell one after another by a conductive coupling member, the assembled battery wiring member being provided with a flat cable formed by covering plural parallel linear conductors with an insulating film and connecting members for connecting the linear conductors to the coupling member, wherein the connecting member is formed by covering a plate-like conductor with an insulation, an end portion of the conductor is connected to the coupling member, another end is connected to the linear conductor through an opening formed on the insulation film of the flat cable, the electronic component is an electronic component which is operated by receiving power supply, some of the plural linear conductors of the flat cable are power wires for supplying power to the electronic component and at least some of the plural conductor portions connect the electronic component to the power wires.

(2) The assembled battery wiring member described in the above (1), further provided with a component mounting member mounting at least one electronic component, wherein the component mounting member has a conductor composed of plural conductor portions and an insulation covering the conductor, one-side end portions of the plural conductor portions are connected to the electronic component and other-side end portions of the plural conductor portions are connected to the linear conductors through openings formed on the insulating film of the flat cable.

(3) The assembled battery wiring member described in the above (1) or (2), wherein the insulation of the connecting member is formed by bonding an first insulation and a second insulation so as to sandwich the conductor and openings are formed on the first and second insulations at positions corresponding to the other-side end portions of the conductor.

(4) The assembled battery wiring member described in any one of the above (1) to (3), wherein a connecting portion between the connecting member and the flat cable is reinforced by a reinforcement member.

What is claimed is:

1. An assembled battery wiring member for an assembled battery configured such that a plurality of single cells each including a positive terminal and a negative terminal are arranged in a predetermined array direction and the positive terminal of one of a pair of single cells adjacent in the array direction is connected to the negative terminal of another single cell one after another by a conductive coupling member, the assembled battery wiring member comprising:
   a flat cable comprising a plurality of linear conductors arranged parallel to each other and an insulating film covering the plurality of linear conductors; and
   a connecting member to connect the plurality of linear conductors to the coupling member,
   wherein the connecting member comprises a plate-shaped conductor and an insulation covering the plate-shaped conductor, one end of the plate-shaped conductor is connected to the coupling member and another end of the plate-shaped conductor is connected to the linear conductors through an opening formed in the insulation film of the flat cable, and
   wherein the connecting member is formed separately from the flat cable and the conductive coupling member.

2. The assembled battery wiring member according to claim 1, wherein the connecting member is configured such that the plate-shaped conductor is divided into a plurality of conductor portions and an electronic component is interposed between the conductor portions.

3. The assembled battery wiring member according to claim 2, wherein the electronic component comprises one of a fuse and a temperature sensor.

4. The assembled battery wiring member according to claim 1, wherein the conductive coupling member comprises a bus bar.

5. The assembled battery wiring member according to claim 1, wherein, in a lateral direction of an extension of the assembled battery, each of the linear conductors extends from an edge of the assembled battery to another edge of the assembled battery.

6. The assembled battery wiring member according to claim 1, wherein, in the predetermined array direction of the single cells, each of the linear conductors extends from an edge of the assembled battery to another edge of the assembled battery.

7. The assembled battery wiring member according to claim 1, wherein, in the predetermined array direction of the single cells, each of the linear conductors extends from an edge of each of the single cells to another edge of said each of the single cells.

8. The assembled battery wiring member according to claim 1, wherein said one end of the plate-shaped conductor and said another end of the plate-shaped conductor are exposed from the insulation.

9. The assembled battery wiring member according to claim 1, wherein the connecting member is attached to each of the flat cable and the conductive coupling member.

10. The assembled battery wiring member according to claim 1, wherein the one end of the plate-shaped conductor is connected to the coupling member at a position between the positive terminal and the negative terminal.

11. The assembled battery wiring member according to claim 1, wherein the flat cable extends to face a side surface of said each of the single cells that extends normal to a top surface of said each of the single cells that includes the positive terminal and the negative terminal.

12. An assembled battery module, comprising:

an assembled battery configured such that a plurality of single cells each including a positive terminal and a negative terminal are arranged in a predetermined array direction and the positive terminal of one of a pair of single cells adjacent in the array direction is connected to the negative terminal of another single cell one after another by a conductive coupling member;

a flat cable comprising a plurality of linear conductors arranged parallel to each other and an insulating film covering the plurality of linear conductors; and a connecting member to connect the plurality of linear conductors to the coupling member, wherein the connecting member comprises a plate-shaped conductor and an insulation covering the plate-shaped conductor, one end of the plate-shaped conductor is connected to the coupling member and another end of the plate-shaped conductor is connected to the linear conductors through an opening formed in the insulation film of the flat cable, and wherein the connecting member is formed separately from the flat cable and the conductive coupling member.

13. The assembled battery module according to claim 12, wherein the flat cable is arranged so as to face a second side surface of the single cell that intersects with a first side surface on which the positive and negative terminals are provided.

14. The assembled battery module according to claim 12, wherein the conductive coupling member comprises a bus bar.

15. The assembled battery module according to claim 12, wherein, in a lateral direction of an extension of the assembled battery, each of the linear conductors extends from an edge of the assembled battery to another edge of the assembled battery.

16. The assembled battery module according to claim 12, wherein, in the predetermined array direction of the single cells, each of the linear conductors extends from an edge of the assembled battery to another edge of the assembled battery.

17. The assembled battery module according to claim 12, wherein, in the predetermined array direction of the single cells, each of the linear conductors extends from an edge of each of the single cells to another edge of said each of the single cells.

18. The assembled battery module according to claim 12, wherein said one end of the plate-shaped conductor and said another end of the plate-shaped conductor are exposed from the insulation.

19. The assembled battery module according to claim 12, wherein the connecting member is attached to each of the flat cable and the conductive coupling member.

20. The assembled battery module according to claim 12, wherein the one end of the plate-shaped conductor is connected to the coupling member at a position between the positive terminal and the negative terminal.

* * * * *